Patented Feb. 16, 1937

2,071,211

UNITED STATES PATENT OFFICE 2,071,211

SOLDER

Cleveland J. McKinney, Hillsdale, Mich.

No Drawing. Application October 19, 1936,
Serial No. 106,453

1 Claim. (Cl. 75—134)

This invention relates to solders and has for an object to provide a solder which will not only solder all metals that conventional solder will unite but also will solder aluminum metal without the use of any flux whatsoever.

A further object of the invention is to provide a solder that will fuse with aluminum metal and produce a strong joint.

A solder constructed in accordance with the invention is composed of tin, lead and copper, in substantially the following proportions.

| | Per cent |
|---|---|
| Tin | 48 |
| Lead | 48 |
| Copper | 4 |

The elements are thoroughly mingled in a melted state and allowed to harden in the form of sticks or bars conveniently shaped for handling.

The solder may be used to solder all metals with the conventional flux and will be found especially valuable in soldering aluminum metal and in connection with the soldering of aluminum metal no flux whatsoever is required.

What is claimed is:

A solder consisting of the following ingredients in the following proportions, tin 48%, lead 48%, and copper 4%.

CLEVELAND J. McKINNEY.